INVENTOR
PETER MEYER
BY
ATTORNEY

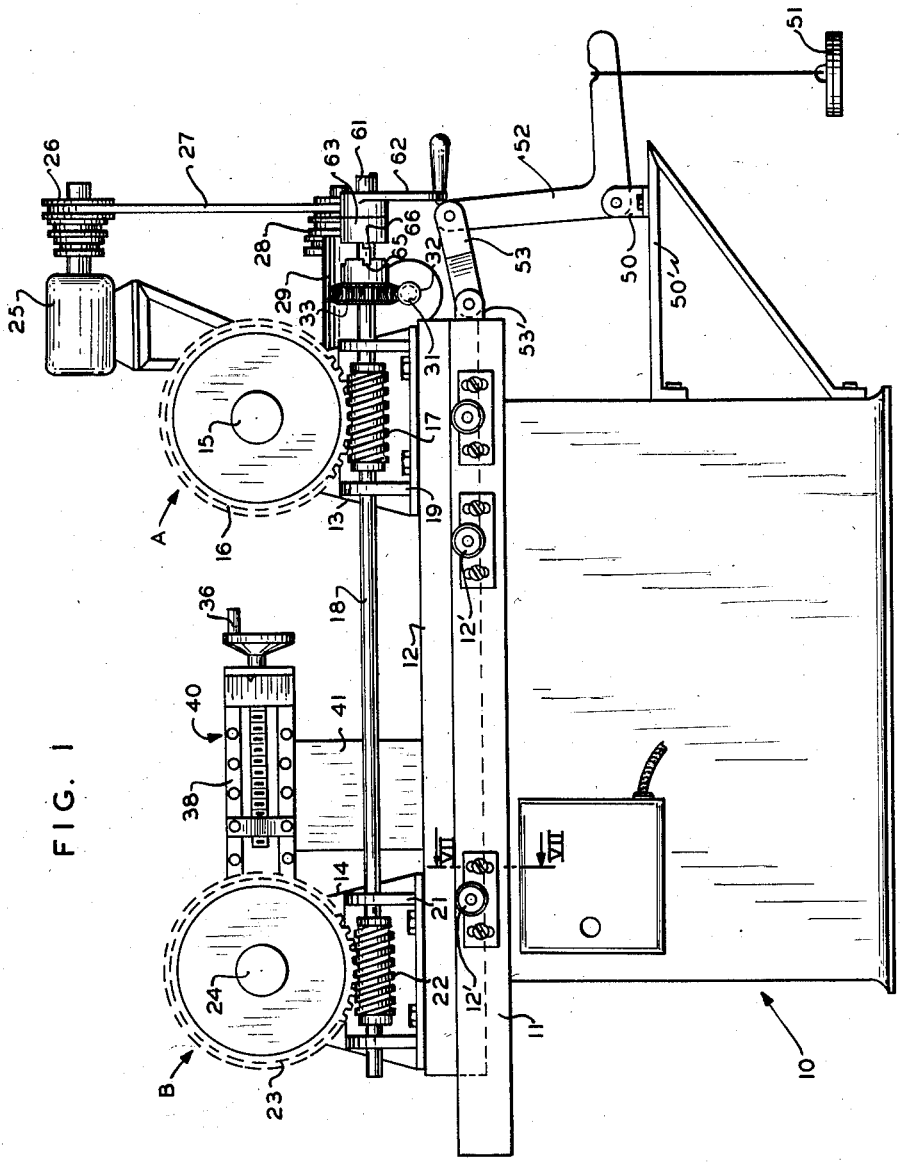

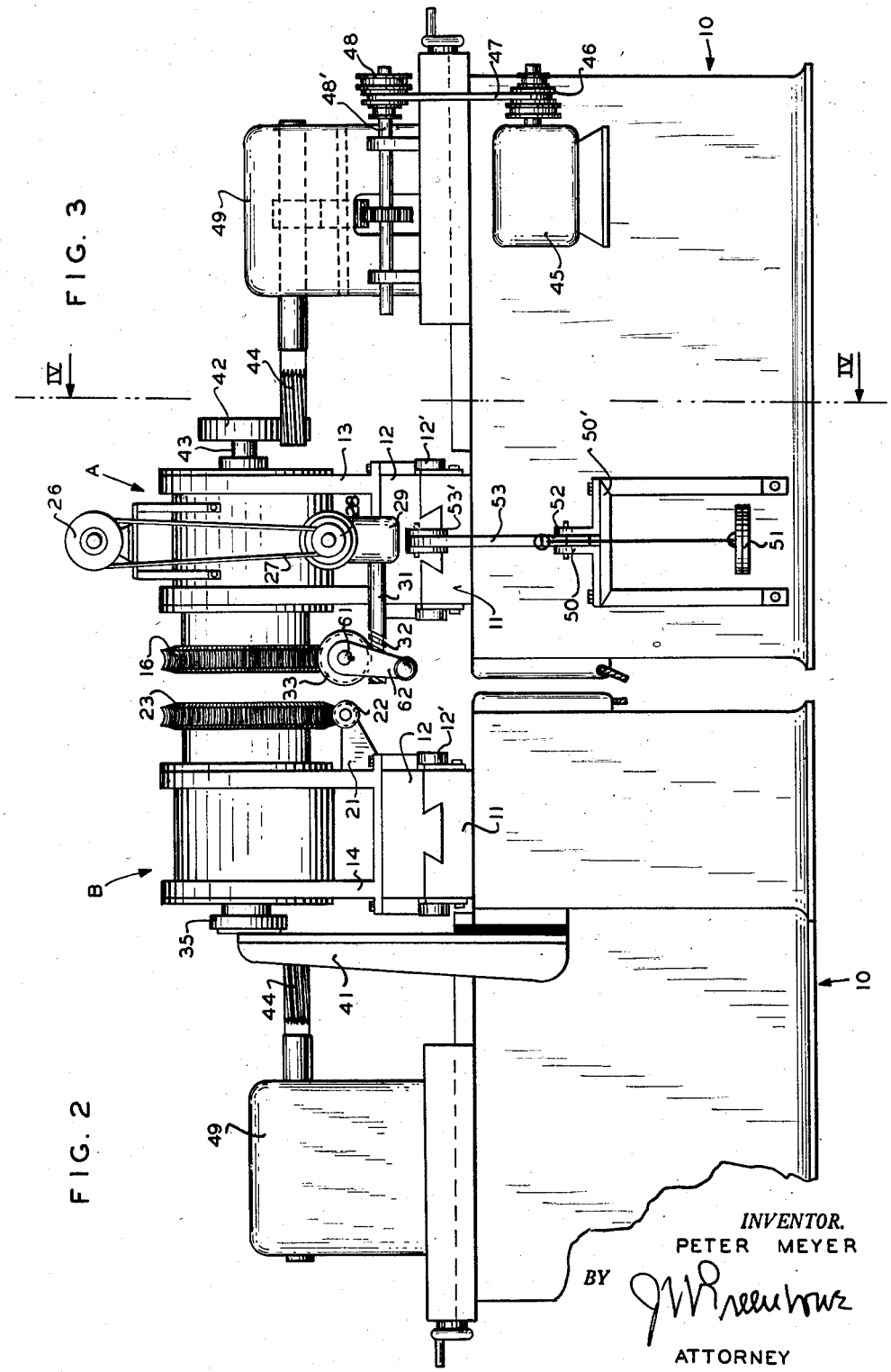

Feb. 10, 1959       P. MEYER       2,872,852

CAM CUTTING MACHINES

Filed Aug. 15, 1955       4 Sheets-Sheet 4

*INVENTOR.*
PETER MEYER
BY
ATTORNEY

United States Patent Office 2,872,852
Patented Feb. 10, 1959

2,872,852

CAM CUTTING MACHINES

Peter Meyer, Watchung, N. J.

Application August 15, 1955, Serial No. 528,273

7 Claims. (Cl. 90—13.4)

The present invention relates to machines for cutting cams and relates more particularly to automatically controlled mechanism therefor.

In the manufacture of certain machine parts such as cams, which must be formed from metal blanks following the design of a master cam, the attention of an attendant is required to make certain adjustments from time to time as needed to insure the accurate formation of a cam duplicating a pattern, and to avoid injury to the cam being cut or to the cutting tool.

In accordance with the present invention a cam cutting machine is provided which includes a support for a rotating master or pattern cam and a support for a rotating blank to be ground or cut. The mountings or supports are moved as a unit on a table or platen and the master cam and the pattern cam are rotated synchronously about axes spaced apart and disposed in a common plane.

Adjacent to the master or pattern cam, and in contact with its perimeter, is a guide member or follower secured to a supporting frame. Adjacent to, and positioned for contact with the perimeter of the blank is a grinder or milling cutter, also secured to a supporting frame. The pattern cam and the cam blank, while rotated at a relatively low rate of speed, are moved as a unit, and the operation is such that the traveling contact between the guide member and the master cam controls the cutting or grinding of the cam blank to produce a duplicate of the pattern cam.

As will be evident, the positive contacting relation between the guide member and the master cam is vital to the successful duplication of the pattern cam. Obviously, therefore, any loss of contact between the guide member and the pattern cam, even to the slightest degree, results not only in the formation of an inaccurate product, but may so affect the relation of the cutter and the blank as to cause damage to either or both. An operator in attendance may be able to observe and correct where the failure of contact can be observed, but in most cases the condition detrimental to the desired result is so minute as not to be perceptible.

The present invention provides a machine so constructed and arranged as to automatically terminate the cam cutting operation upon any loss of contact between the guide roller and the pattern or master cam.

It is, therefore, an object of the present invention to provide a cam cutting machine so constructed and arranged as to operate in the absence of an attendant, to automatically prevent a cutting operation upon any separation between the cam follower and the master cam to avoid continued operation detrimental to the formation of a useful cam or to the cutting tool.

Another object of the invention is to maintain operating relation between the cutting tool and blank and contacting relation between the cam follower and master cam, and to automatically terminate the cam cutting operation when said cam follower moves from contacting relation with the master cam.

Other objects and advantages of the invention will be more fully understood from the following description together with the following drawing in which:

Fig. 1 is a side elevational view of a machine constructed in accordance with the present invention;

Fig. 2 is an elevational view of one end of the machine;

Fig. 3 is an elevational view of the other end of the machine;

Figure 4:
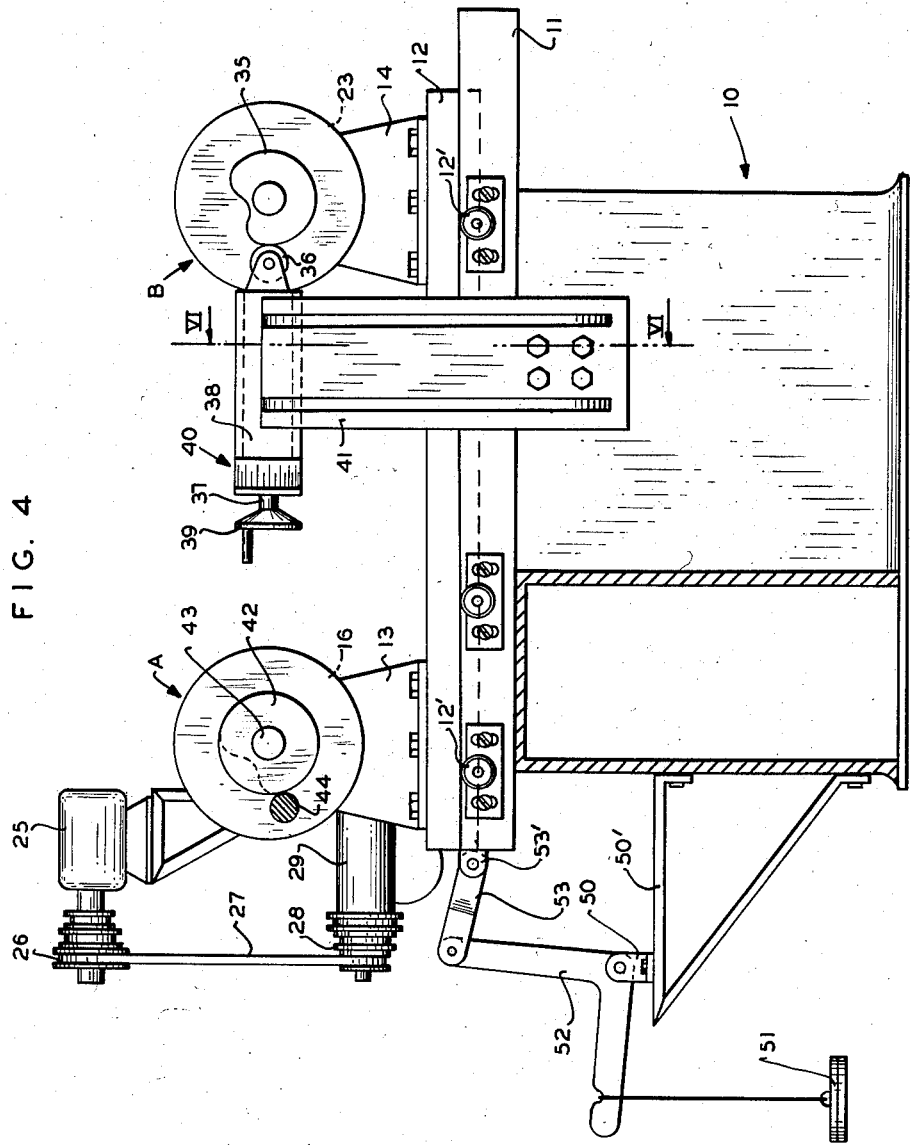
Fig. 4 is a view taken on line IV—IV in Fig. 3.
Figure 5:
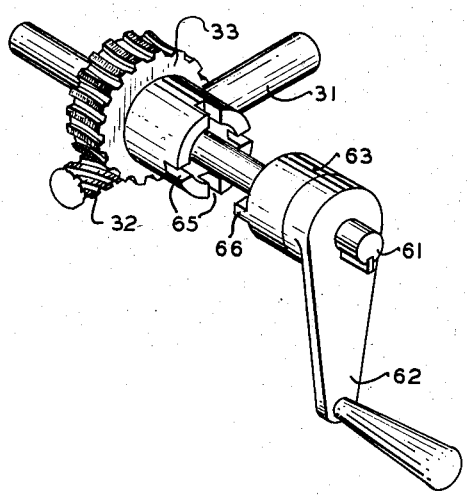
Fig. 5 is a perspective view of clutch mechanism for manually adjusting the master cam.
Figure 6:
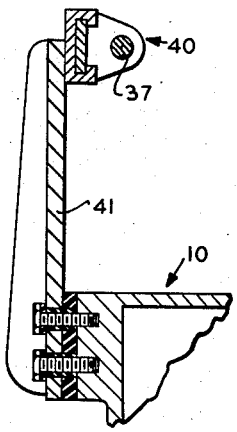
Fig. 6 is a view taken on line VI—VI in Fig. 4.
Figure 7:
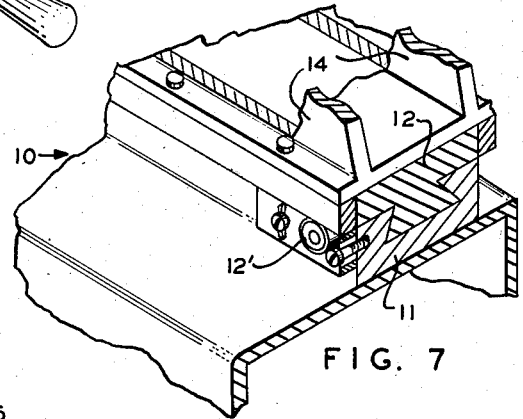
Fig. 7 is a perspective view of a portion of the frame and platen take on line VII—VII in Fig. 1; and, Fig. 8 is a schematic view of an electrical circuit employed in the operation of the present machine.

As shown, a machine constructed in accordance with one practical embodiment of the invention includes a standard or frame 10 on which is mounted a base 11 for a slide member or platen 12, movable on adjustable rollers 12'. Brackets 13 and 14 are secured to the slide member 12 for movement therewith. Bracket 13 supports a spindle 15 at one end of which is mounted a drum A with worm wheel 16 in mesh with a worm 17 rotatable on shaft 18 journaled in bearing brackets 19 and 21. A worm 22 is also mounted on shaft 18 and disposed in mesh with worm wheel 23 mounted on a drum B rotatable on spindle 24 and supported on bracket 14.

The drums A and B on spindles 15 and 24 respectively are driven by means of a suitable standard brake motor 25 provided with cone pulley 26 connected by belt 27 to a cone pulley 28 on a shaft of reduction gear box 29. Shaft 31 extending from gear box 29 drives a worm 32 in mesh with worm wheel 33 keyed or feathered to shaft 18 whereby the shaft may be rotated while movable endwise to permit travel of the drums A and B as a unit with slide member 12.

Secured to one end of the shaft of drum B (see Fig. 4) is a master cam 35 of any selected configuration for rotation with the drum. Adjacent to the master cam is guide roller or cam follower 36 mounted at one end of a threaded rod 37 rotatable in an internally threaded housing 38. The other end of rod 37 is provided with a hand wheel 39. The housing and threaded rod which perform to give longitudinal adjustment in what may be termed a tail stock 40 are mounted on a bracket 41 secured to standard 10. A rotation of hand wheel 39 serves to move the roller 36 into or out of contact with the peripheral surface of the master or pattern cam 35.

A cam blank 42 is secured to an end 43 of the shaft of drum A for rotation with the drum in unison with the rotation of drum B on which the master cam is mounted for rotation. The cam blank or stock 42 from which a cam, duplicating cam 35, is to be formed may be shaped by grinding or by the controlled application of a milling cutter 44.

This cutter 44 may be rotated by a brake motor 45 of any suitable well known type (see Fig. 3) secured to standard 10 and having a cone pulley 46 connected by belt 47 to cone pulley 48 at one end of a shaft 48' extending from a reduction gear box 49 mounted on standard 10, to translate rotary motion to cutter 44 in a manner well known in the art where a high power cutting tool is to be employed.

The drums carrying the master cam and cam blank being movable as a unit may be adjusted to bring cutter 44 into contact with cam blank 42 and the master cam 35 adjacent roller 36. The roller or cam guide member being adjustable in tail stock 40, hand wheel 39 may be actuated to bring roller 36 into operative contact with the peripheral surface of the pattern cam 35.

When the cutter 44 and cam follower 36 are in operative relation to the cam blank and master or pattern cam, contact must be maintained throughout the cam forming operation. This may be accomplished in the usual manner by providing a weight 51 suspended from a lever member or bell-crank 52 pivoted at 50 on bracket 50'. An arm of crank 52 is connected to link 53 which in turn is connected at 53' to one end of the slide member 12 to move the drums or supports for the rotating cam blank and master cam.

The actual cam cutting operation is performed at relatively slow rate of speed. The drums which serve as supports for the rotating master cam and blank are, as pointed out, driven by worms and worm wheels. The ratio of the gearing is such that the drums make one complete revolution every thirty minutes, more or less, depending on the character of the material to be formed.

When a master cam is in position on a drum, however, it is necessary to rotate the drum to position the cam follower in a selected contacting position which is usually contiguous with the cylindrical or greater diameter of the master cam.

In order to more quickly rotate to set the master cam, independently of the power drive, one end 61 of shaft 18 is provided with a crank 62 having a hub 63 in which shaft 18 is rotatable normally. The shaft is provided with female notches 65 to receive male teeth 66 on hub 63 upon endwise movement of the crank on the keyed or feathered shaft 18. When the clutch is engaged, a rotation of shaft 18 by means of hand crank 62 will cause a rotation of the drums and the master cam may be positioned to receive the roller 36 at which time the cutter 44 will be positioned adjacent to the cam blank. The hand crank 39 of the tail stock 40 is then actuated to bring roller 36 into contact with a selected point on the master cam. Inasmuch as the drums A and B or rotatable supports for the cam and cam blank are moved as a unit, the force exerted, as pointed out, tends to maintain the cutter and cam blank in cutting relation, and the roller and master cam in contacting relation whereby the guide roller controls the path of travel of the cutter in accordance with the path of travel of the guide roller 36 over cam blank or master cam 35.

As mentioned above, in the grinding or cutting of a cam to duplicate a given pattern, it is important to avoid the cutting or grinding operation in the event that the guide roller for any reason breaks contact with the pattern or master cam.

In accordance with the present invention the cam follower and pattern cam constitute elements of an electrical circuit and contact between the guide member or cam follower and the pattern cam causes a flow of electrical energy to operate the motors which supply the source of power for the cam forming operation. Thus, when a cam is being cut and the cam follower is moved out of positive contact with the master cam, the entire operation will be terminated. The motors employed being of the self-braking type, the stoppage is effected instantly. When this condition occurs, means are provided to give audible and/or visible indication of the stoppage, whereupon an operator may be informed to make the necessary adjustments for the continued cam cutting operations.

Figure 8:
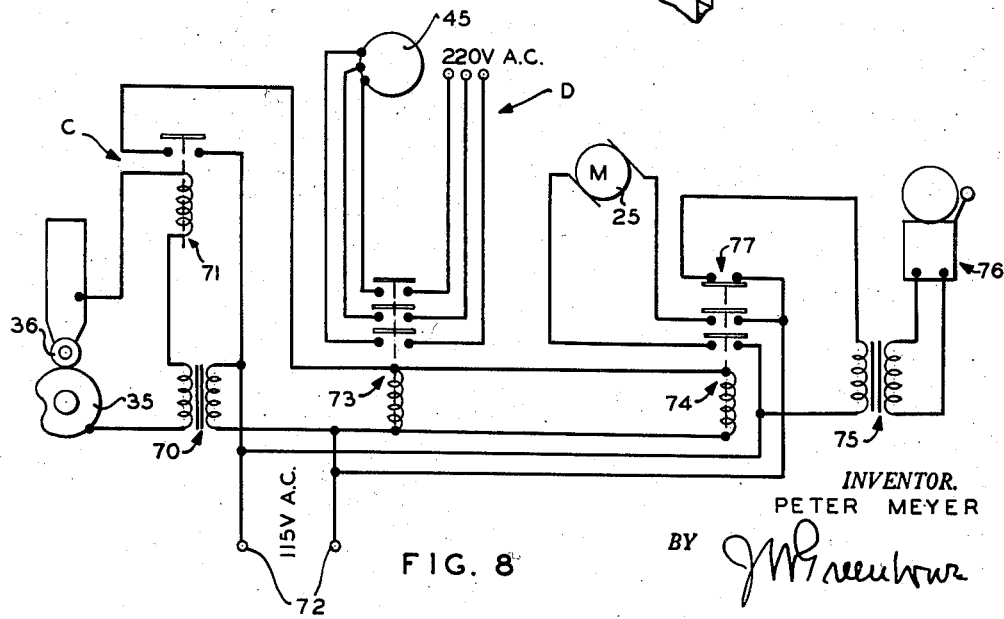

As shown in the schematic circuit arrangement (Fig. 8) a relatively low voltage source 72 supplies electrical energy to what may be termed a control circuit C including pattern-cam 35 and cam follower 36, a transformer 70 as indicated, and a relay 71. When current flows in circuit C, relay 71 closes what may be termed a relatively high voltage power circuit D provided with stepped relay 73 which, when actuated, closes circuit to motor 45, to operate milling cutter 44. Circuit D includes a sequence relay 74 which, when actuated, closes for the flow of current to motor 25 for rotating drums A and B to rotate cam blank 42 and pattern cam 35, and opens contact 77 to break the flow of electrical energy in a by-pass circuit including transformer 75 and bell or other signal 76.

Thus, when the cam follower 36 is in contacting relation with pattern cam 35, relays 73 and 74 will be closed to permit the flow of electrical energy for the operation of motors 45 and 25 and relay contact 77 will be open to prevent current flow for the operation of the bell or other signal.

If during the cam cutting operation the cam follower, which controls the accurate cutting of the cam blank, should break contact with the pattern cam, the termination of the flow of electrical energy in the control circuit C will cause relay 71 to break the power circuit D, rendering the motors 45 and 25 inoperative and relay 74 will close the bell or signal circuit for the operation of the bell 76 as an audible signal or, as mentioned above, a light may be employed to give visible indication of the fact that a condition exists requiring the attention of an operator.

It will be clear from the foregoing that by reason of the present invention the cam cutting operation has been brought under automatic control to the extent of assuring the cutting of a cam without loss due to mechanical defects, giving a more accurate product with great economic advantages.

Although a preferred embodiment of the invention is shown and described herein, it is to be understood that modifications may be made therein without departing from the spirit and scope of the invention, as set forth in the appended claims.

What is claimed is:

1. A cam cutting machine in combination with a pattern cam and a cam blank, a support for said pattern cam, a support for said cam blank, means for rotating said supports through a complete cycle of rotation, a cutting tool, means for holding said blank in cutting relation to said tool, a guide member, means for holding said guide member normally in contact with said pattern cam to control the operation of said cutting tool during contact between said guide member and said pattern cam, and means for terminating the operation of said cutting tool upon movement of said guide member out of contact with said pattern cam at any part of said cycle of rotation, said blank and tool being retained at the position where operation terminated ready for resumption of operation thereat.

2. A cam cutting machine in combination with a pattern cam and a cam blank, a support for said pattern cam, a support for said cam blank, means for rotating said supports through a complete cycle of rotation, a cutting tool movable relative to said cam blank, a guide member normally in contact with said pattern cam controlling the relative movement of said cutting tool and said cam blank during movement of said guide member while in contact with said pattern cam, and means for terminating the rotary movement of said supports when said guide member moves from contacting relation with said pattern cam at any part of said cycle of rotation.

3. A cam cutting machine in combination with a pattern cam and a cam blank, a support for said pattern cam, a support for said cam blank, means for rotating said support through a complete cycle of rotation, a cutting tool, means for actuating said cutting tool, a guide member, means for moving said cutting tool into contact with said blank, means for moving said guide member into contact with said pattern cam, the relative movement of said guide member and said pattern cam while in contacting relation controlling the movement of said cutting tool applied to said cam blank, means actuated by movement of said guide member from contact with said blank at any part of said cycle of rotation to terminate the rotary movement of said supports.

4. A cam cutting machine in combination with a pattern cam and a cam blank, a support for said pattern cam, a support for said cam blank, a motor for rotating said supports, a cutting tool, means for actuating said cutting tool, a cam follower, means for moving said cutting tool into contact with said blank, means for moving said cam follower into contact with said pattern cam, the relative movement of said guide member and said pattern cam when in contacting relation controlling the movement of said cutting tool applied to said cam blank, an electrical circuit for said motor including said cam follower and said pattern cam in electrical series in said circuit, contacting relation between said cam follower and said pattern cam causing a flow of electrical energy in said circuit to actuate said motor to rotate said supports and to terminate the flow of electrical energy to terminate operation of said motor when said cam follower and pattern cam break contact.

5. A cam cutting machine in combination with a pattern cam and a cam blank, a support for said pattern cam, a support for said cam blank, a motor for rotating said supports through a complete cycle of rotation, a cutting tool, a motor for actuating said cutting tool, a guide member, means for moving said cutting tool into contact with said blank, means for moving said guide member into contact with said pattern cam, the relative movement of said guide member and said pattern cam when in contacting relation controlling the movement of said cutting tool applied to said cam blank, an electrical circuit for said motors including said guide member and said pattern cam in electrical series in said circuit, contacting relation between said guide member and said pattern cam causing a flow of electrical energy in said circuit to actuate said motors to perform a cam cutting operation, contact failure between said guide member and said pattern cam terminating the flow of electrical energy in said circuit to terminate the cam cutting operation at any part of the cycle of rotation to terminate the rotary movement of said supports.

6. A cam cutting machine in combination with a master cam, a support for said master cam, a cam follower disposed in contact with said cam, a motor for rotating said cam, an electrical circuit including said cam and cam follower in electrical series therewith when in contacting relation for the flow of electrical energy to actuate said motor and for terminating the operation of said motor when said cam and cam follower are not in contacting relation.

7. A cam cutting machine in combination with a cam pattern and a cam blank, a rotatable support for said pattern cam, a rotatable support for said cam blank, means for rotating said supports synchronously, a milling cutter, means for supporting said cutter adjacent to said cam blank, a cam follower, means for supporting said cam follower adjacent to said pattern cam, means for moving said rotatable supports as a unit to position said milling cutter in cutting relation to said cam blank, means for adjusting said cam follower for contact with said pattern cam, an electrical control circuit including said contacting cam follower and pattern cam in electrical series in said control circuit, an electrical power circuit, a motor in said power circuit for driving said milling cutter, a relay in said control circuit, said relay operating to close said power circuit when said cam blank and cam follower are in contacting relation, said relay operating to open said power circuit and terminate operation of said cutter when said cam blank and cam follower break said contacting relation at any part of the cycle of rotation thereof.

References Cited in the file of this patent

UNITED STATES PATENTS

| | | |
|---|---|---|
| 431,578 | Guerrant | July 8, 1890 |
| 2,228,902 | Allen | Jan. 14, 1941 |
| 2,412,339 | Jeffreys | Dec. 10, 1946 |
| 2,507,547 | Shephard | May 16, 1950 |
| 2,511,956 | Wetzel | June 20, 1950 |
| 2,699,606 | Breau | Jan. 18, 1955 |
| 2,733,642 | Beatty et al. | Feb. 7, 1956 |
| 2,745,319 | Sawyer | May 15, 1956 |
| 2,812,695 | Gunderson | Nov. 12, 1957 |